United States Patent
Tsuwa

(10) Patent No.: US 8,249,198 B2
(45) Date of Patent: Aug. 21, 2012

(54) DEMODULATION CIRCUIT OF DIFFERENTIAL PHASE SHIFT KEYING (DPSK) MODULATED SIGNALS

(75) Inventor: Takashi Tsuwa, Kyoto (JP)

(73) Assignee: Rohm Co., Ltd. (JP)

( * ) Notice: Subject to any disclaimer, the term of this patent is extended or adjusted under 35 U.S.C. 154(b) by 721 days.

(21) Appl. No.: 12/366,960

(22) Filed: Feb. 6, 2009

(65) Prior Publication Data

US 2009/0196376 A1  Aug. 6, 2009

(30) Foreign Application Priority Data

Feb. 6, 2008 (JP) .................. 2008-026860

(51) Int. Cl.
*H03D 3/22* (2006.01)

(52) U.S. Cl. ...................... 375/330; 375/316

(58) Field of Classification Search .......... 375/329–333, 375/308, 279–284
See application file for complete search history.

(56) References Cited

U.S. PATENT DOCUMENTS

| | | | | |
|---|---|---|---|---|
| 5,610,949 A | * | 3/1997 | Petranovich | 375/330 |
| 6,961,393 B1 | * | 11/2005 | Cupo et al. | 375/343 |
| 6,973,142 B2 | * | 12/2005 | Chen et al. | 375/330 |
| 2005/0008101 A1 | * | 1/2005 | Kazi et al. | 375/330 |

FOREIGN PATENT DOCUMENTS

| | | |
|---|---|---|
| JP | 04-15183 A | 5/1992 |
| JP | 09-116584 A | 5/1997 |
| JP | 2002-290294 A | 10/2002 |

OTHER PUBLICATIONS

Japanese Office Action for Japanese patent application No. 2008-026860 mailing date of Jun. 5, 2012.

* cited by examiner

*Primary Examiner* — Sam K Ahn
*Assistant Examiner* — Janice Tieu
(74) *Attorney, Agent, or Firm* — Cantor Colburn LLP

(57) ABSTRACT

A demodulation circuit demodulates a differential phase shift keying (DPSK) modulated received signal. A phase difference data generator compares phase data representing a phase of the received signal input at every predetermined sampling time with previous phase data preceding by one symbol time to generate phase difference data representing a phase shift amount of the phase data. A symbol selection unit evaluates the phase difference data generated at every sampling time to select as a symbol.

14 Claims, 4 Drawing Sheets

DEMODULATION CIRCUIT OF DIFFERENTIAL PHASE SHIFT KEYING (DPSK) MODULATED SIGNALS

BACKGROUND OF THE INVENTION

1. Field of the Invention

The present invention relates to a demodulation technique for demodulating differential phase shift keying (DPSK) modulated received signals.

2. Description of the Related Art

Recently, various standards or types of wireless communication systems have been proposed in order to facilitate data reception/transmission between a number of electronic devices. For example, a Bluetooth standard compliant communication system DPSK-modulates carrier waves using digital modulation data.

Patent Document: Japanese Patent Application Laid-Open No. 2002-290294

In DPSK modulation, a phase shift amount between neighboring symbols may correspond to the amount of codes to be demodulated. Phase data representing a phase of the received signal are oversampled by an integer multiple, for example, 8 or 16 times of a symbol rate. When symbols are extracted from the oversampled phase data, according to a conventional demodulation circuit, the phase shift amounts between a piece of the phase data employed as a previous symbol and each piece of the phase data being currently sampled are computed, and a phase difference data most approximate to a predetermined expectation value is employed as a current symbol.

This method may be applicable on the assumption that the phase of the previous symbol is accurate. However, under a practical communication environment, the symbol is difficult to be consistent with an ideal constellation. When the previous symbol is not consistent with the ideal constellation, it is difficult to accurately evaluate the phase shift amount, and this may influence selection of a current symbol, so that receiving sensitivity may be degraded. That is, this method has an algorithm significantly affected by accuracy of the previous symbol.

SUMMARY OF THE INVENTION

The present invention has been made in view of those circumstances, and has a general purpose of the invention to provide a demodulation technique capable of improving receiving sensitivity.

According to an aspect of the invention, there is provided a demodulation circuit for demodulating a differential phase shift keying (DPSK) modulated received signal. The demodulation circuit may include: a phase difference data generator which compares phase data representing a phase of the received signal input at every sampling time with previous phase data preceding by one symbol time to generate phase difference data representing a phase shift amount between the phase data of the received signal and the previous phase data; and a symbol selection unit which evaluates the phase difference data generated at every predetermined sampling time to select as a symbol.

Since the phase difference data of each sampling point is compared with not the phase difference data employed as a previous symbol but the phase difference data preceding by one symbol time from each pieces of the phase difference data, the phase shift amount can be evaluated without depending on accuracy of the previous symbol.

The phase difference data generator may include a memory unit which stores the phase data input at every sampling time, and a first operation unit which computes a phase shift amount of current phase data for the phase data preceding by one symbol time stored in the memory unit to generate the phase difference data.

The memory unit may be an n-stage First-In-First-Out (FIFO) memory device when the symbol time is n multiples of the sampling time (where, n is any natural number). By using the FIFO (e.g., a shift register), the phase difference data at each sampling time may be very appropriately generated.

The phase difference data generator may have a second operation unit which shifts the phase difference data by a predetermined amount corresponding to $\pi/8$, and the phase difference data shifted by the predetermined amount in the second operation unit may be transferred to a subsequent process when the received signal is 8-DPSK modulated.

In this case, for the circuits of subsequent stages, 8-DPSK and 4-DPSK (or $\pi/4$ shifted 4-DPSK) modulation schemes can be similarly processed.

The phase difference data generator may encode a predetermined number of bits having an upper level of the phase difference data and output them to the symbol selection unit.

The symbol selection unit may select phase difference data having a value most approximate to a predetermined expectation value as a symbol.

The symbol selection unit may determine, as a symbol selection timing, a location where the encoded data output at every sampling time consecutively has a constant value.

In this case, it is possible to estimate a value of the phase difference data most approximate to the expectation value.

For a data period, the symbol selection unit may select, as a current symbol candidate, a piece of the phase difference data delayed by one symbol time from the phase difference data selected as a previous symbol and preceding and following m pieces (where, $1 \leq m < n$) of the phase difference data among the phase difference data generated at any sampling time when the symbol time is n multiples of the sampling time (where, n is any natural number).

For a preamble period, the symbol selection unit may select as a current symbol candidate all pieces of the phase difference data generated at every sampling time when the symbol time is n multiples of the sampling time (where, n is any natural number). It is possible to accurately obtain the initiation time of the data period by selecting as a target of evaluation all pieces of phase data for the preamble period.

The symbol selection unit may select, as a current symbol candidate, the phase difference data delayed by one symbol time from the phase difference data selected as a previous symbol and preceding and following m pieces (where, $1 \leq m < n$) of the phase difference data among the phase difference data generated at every sampling time when the symbol time is n multiples of the sampling time (where, n is any natural number). A value of the natural number m may be changed between the preamble period and the data period.

The received signal may have a Bluetooth standard compliant format.

According to another aspect of the invention, there is provided a wireless device comprising: a receiver circuit which receives a differential phase shift keying (DPSK) modulated received signal and generate phase data representing a phase of the received signal at every predetermined sampling time; and the above-described demodulation circuit which demodulates the phase data output from the receiver circuit.

According to this aspect, it is possible to improve receiving sensitivity.

According to another aspect of the invention, there is provided a method of demodulating a DPSK modulated received signal. The method may include: generating phase data representing a phase of the received signal at every predetermined sampling time; comparing phase data generated at every sampling time with phase data preceding by one symbol time to generate phase difference data representing a phase shift amount between two kinds of the phase data; and selecting as a symbol a piece of the phase difference data most approximate to a predetermined expectation value among the phase difference data generated at every sampling time.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the description, "A is connected to B" means that members A and B may be directly connected to each other or indirectly connected by way of another member which does not affect electrical connection therebetween in a physical sense. Similarly, "C is interposed between A and B" means that members A and C or members B and C may be directly connected to each other or indirectly connected by way of another member which does not affect electrical connection therebetween.

Figure 1:
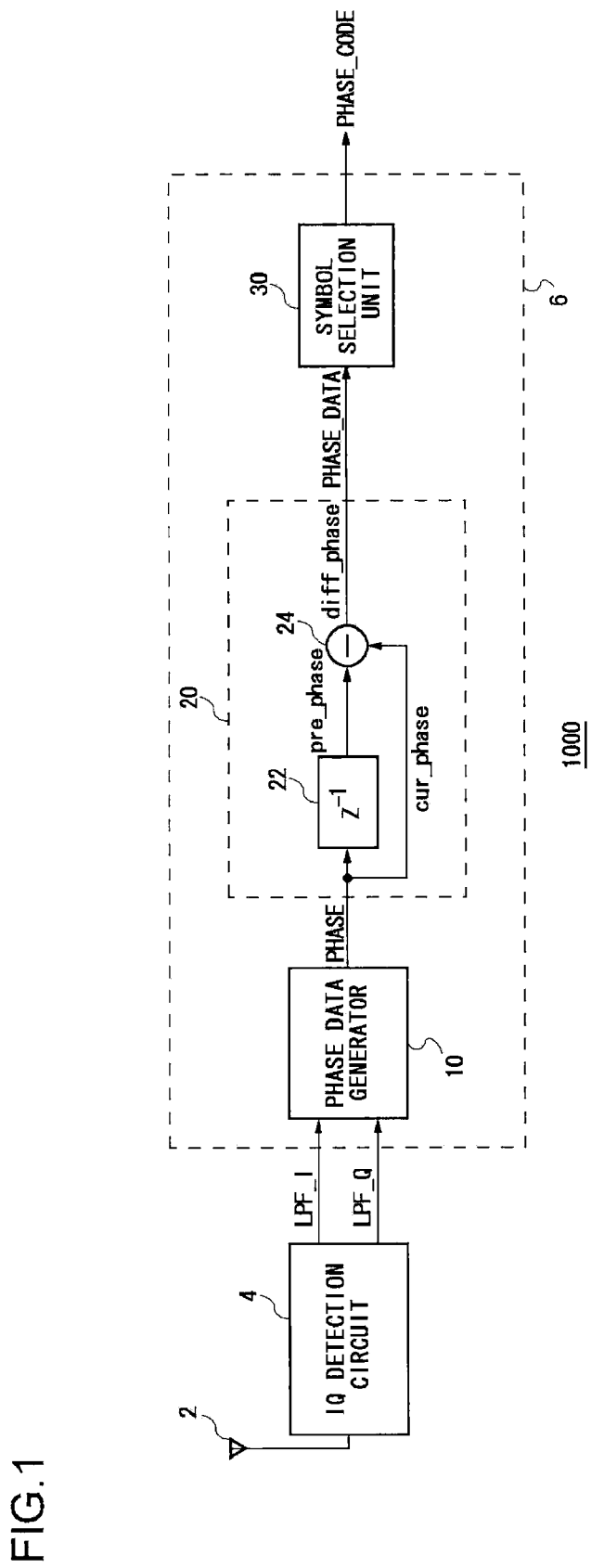
FIG. 1 is a block diagram illustrating a receiver according to an embodiment of the present invention.

FIG. 1 is a block diagram illustrating a receiver 1000 according to an embodiment of the present invention. The receiver 1000 of a wireless communication system (not shown in the drawing) receives and transmits differential phase shift keying (DPSK) modulated carrier waves. While the invention will be described by assuming that the wireless communication system communicates on the basis of a Bluetooth standard, other standards may be also employed without limitation.

The transmitter modulates a digital signal using a DPSK modulation scheme and transmits the DPSK modulated high frequency (i.e., radio frequency) signal Srf. The receiver 1000 receives the RF signals Srf transmitted from the transmitter, and demodulates the RF signals into digital signals. The receiver 1000 has an antenna 2, an IQ detection circuit 4, and a demodulation circuit 6. According to the Bluetooth standard, the RF signals Srf are demodulated on the basis of any one of an 8-level differential phase shift keying (8-DPSK) scheme or a 4-level differential phase shift keying (4-DPSK) scheme.

The antenna 2 receives the received RF signal of DPSK modulated carrier wave frequency of 2.4 GHz RF (modulated wave). The RF signal Srf is input to the IQ detection circuit 4. The IQ detection circuit 4 performs frequency conversion (down-conversion) to a 2.4 GHz RF signal and separates it into in-phase components and quadrature components to output an in-phase signal LPF_I and a quadrature signal LPF_Q after filtering.

The demodulation circuit 6 includes a phase data generator 10, a phase difference data generator 20, and a symbol selection unit 30.

The phase data generator 10 receives the in-phase signal LPF_I and the quadrature signal LPF_Q. Both of the in-phase signal LPF_I and the quadrature signal LPF_Q are digital signals that have been sampled in a predetermined sampling rate fs. For example, the sampling rate fs may be set to 8 MHz which is 8 times of a Bluetooth standard symbol rate fsym=1 MHz.

The phase data generator 10 computes an arc tangent arctan(LPF_I, LPF_Q) of the in-phase signal LPF_I and the quadrature signal LPF_Q to generate phase data PHASE representing the phase of the received signal (i.e., a declination angle against the in-phase component). The phase data PHASE is oversampled at a sampling frequency of fs=16 MHz which is 2 times of an original frequency of 8 MHz.

The phase difference data generator 20 receives the phase data PHASE input at every predetermined sampling time Ts (=1/fs). The phase difference data generator 20 compares phase data cur_phase being sequentially input with the phase data pre_phase preceding one previous symbol time Tsym(=1/fsym) to generate phase difference data diff_phase representing a phase shift amount (i.e., phase difference) between the two pieces of the phase data.

The phase difference data generator 20 includes a memory unit 22 and a first operation unit 24. The memory unit 22 stores the phase data PHASE input at every sampling time. For example, the memory unit 22 includes a delay circuit having a first-in-first-out (FIFO) memory device, a shift register, a flip-flop, or the like. The first operation unit 24 computes a phase shift amount between the current phase data cur_phase and the phase data pre_phase of one previous symbol time stored in the memory unit 22 to generate the phase difference data diff_phase.

The symbol selection unit 30 receives the phase difference data PHASE_DATA corresponding to the phase difference data diff_phase generated at every sampling time. The symbol selection unit 30 selects as a symbol a piece of the phase difference data PHASE_DATA most approximate to a predetermined expectation value among the phase difference data PHASE_DATA generated at every sampling time. The expectation value may be set to ±π/4 (±45 degree) or ±π/4 (±135 degree) in a π/4-DQPSK scheme used to transmit data at a frequency of 2 Mbps. In a 8-DPSK scheme used to transmit data at a frequency of 3 Mbps, the expectation value may be set to 0 (0 degree), ±π/4 (±45 degree), ±π/2 (±90 degree), ±π/4 (±135 degree), or π(180 degree).

Figure 2A:
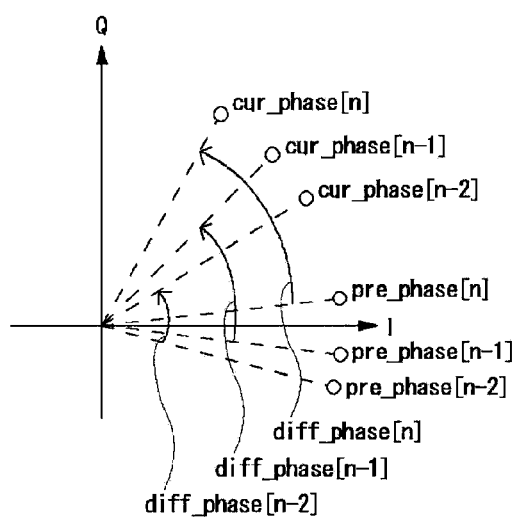
FIGS. 2A and 2B illustrate a demodulation method according to an embodiment of the present invention and a conventional demodulation method.
Figure 2B:
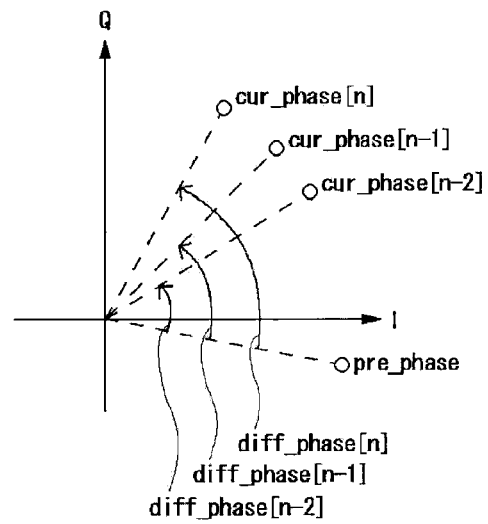

FIGS. 2A and 2B illustrate demodulation methods according to an embodiment of the present invention and a conventional demodulation method, respectively. As shown in FIG. 2B, according to the conventional DPSK demodulation, the phase shift amount diff_phase of the current phase data cur_phase on the basis of the previous phase data pre_phase selected as a previous symbol is computed, and a piece of the phase shift amount most approximate to the expectation value is selected as a current symbol. Therefore, when the previous symbol is not consistent with an ideal constellation, the phase shift amount is difficult to be accurately evaluated, and this may affect current symbol selection, so that receiving sensitivity may be degraded.

On the contrary, in the demodulation circuit 6 according to an embodiment of the present invention, as shown in FIG. 2A, the phase difference data diff_phase of each sampling point are computed as not the shift amount for a piece of the phase difference data diff_phase selected as a previous symbol but the shift amount for a piece of the phase difference data pre_phase preceding one symbol time from each piece of the current phase difference data cur_phase. Therefore, the phase shift amount can be evaluated without depending on accuracy of the previous symbol. As a result, it is possible to improve receiving sensitivity in comparison with the conventional method.

Figure 3:
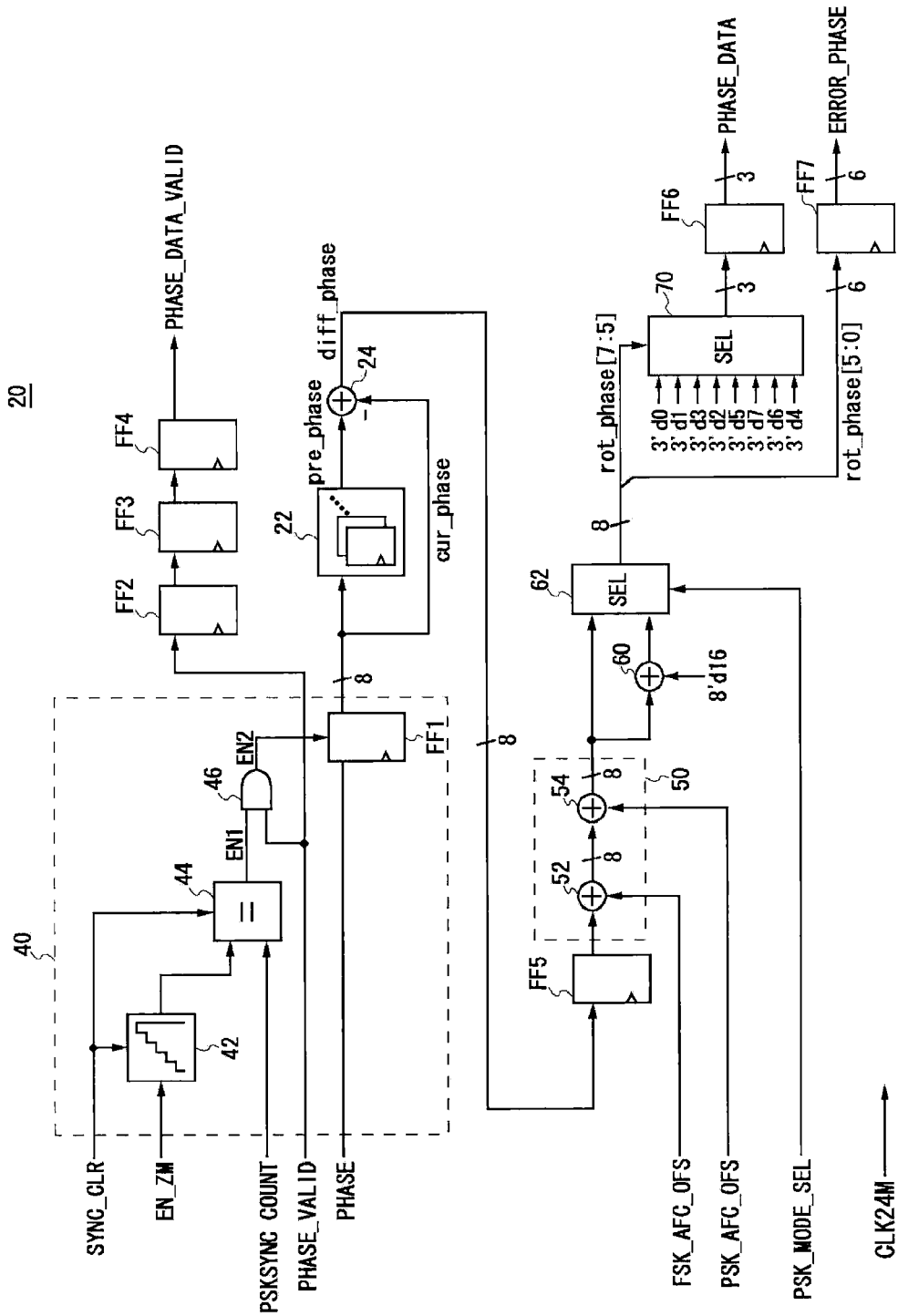
FIG. 3 is a block diagram illustrating a phase difference data generator of FIG. 1.

Subsequently, the demodulation circuit 6 of FIG. 1 will be described in detail. FIG. 3 is a block diagram illustrating a phase difference data generator 20 of FIG. 1. The phase difference data generator 20 includes a synchronization counter 40, a memory unit 22, a first operation unit 24, an offset compensator 50, a phase shift unit 60, a mode switch selector 62, an encoder 70, and a synchronization flip-flop FF.

The synchronization counter 40 performs timing control for initiating synchronization detection. If a phase validation signal PHASE_VALID is asserted (i.e., toggled to a high level) after initiating the demodulation synchronization, transition of a clock signal EN_2M having a frequency of 2 MHz is counted. When the count value reaches a synchronization initiation timing signal PSKSYNC COUNT, the phase data PHASE subsequently input are used in subsequent processes as valid data.

In order to implement this function, the synchronization counter 40 includes a counter 42, a comparator 44, and an AND gate 46. The counter 42 counts the clock EN_2M. The comparator 44 compares the count value of the counter 42 with the synchronization initiation timing signal PSKSYNC COUNT to output an enable signal EN1 representing the comparison result. The AND gate 46 generates a logic product between the enable signal EN1 and the phase validation signal PHASE_VALID to output the result as an enable signal EN2. The counter 42 and the comparator 44 are initialized by a synchronization clear signal SYNC_CLR.

The first flip-flop FF1 receives the phase data PHASE to synchronize this data with an internal clock. The first flip-flop FF1 is activated when the enable signal EN2 is at a high level and inactivated when the enable signal EN2 is at a low level.

The phase data PHASE retimed by the first flip-flop FF1 are input to the phase difference data generator 20. An IF signal can be masked by the synchronization counter 40 during a guard period. In other words, the value of the synchronization initiation timing signal PSKSYNC COUNT is set on the basis of the length of the guard period. Particularly, since the pattern of the IF signal during the guard period is not prescribed in the Bluetooth standard, it is not possible to obtain synchronization when this pattern is coincident with a synchronization pattern of preamble. However, it is possible to obtain synchronization by preparing the synchronization counter 40. A clock CLK24M having a frequency of 24 MHz is input to the clock terminal of the flip-flop FF shown in FIG. 3.

As described above, the phase difference data generator 20 includes a memory unit 22 and a first operation unit 24. The phase data PHASE is 8-bit serial data oversampled at a frequency 16 times of the symbol rate. Therefore, the memory unit 22 includes a FIFO having a capacity of 8 bit×16 stages (=128 bits) in order to store all pieces of the phase data PHASE of one symbol time and to allow the phase data PHASE to be shifted from the least significant bit LSB to the most significant bit MSB. For this reason, the most significant 8 bits pre_phase_array[127:120] of the phase data array pre_phase_array[127:0] stored in the memory unit 22 corresponds to the data pre_phase preceding by one symbol time.

The first operation unit 24 computes the current phase data cur_phase on the basis of the most significant 8 bits pre_phase_array[127:120] to generate phase difference data diff_phase. The phase difference data diff_phase is output to the symbol selection unit 30 disposed in the next stage.

The flip-flop FF5 synchronizes the phase difference data diff_phase with the clock CLK24M.

The offset compensator 50 corrects the phase difference data diff_phase using the frequency offset of the carrier wave. The offset compensator 50 receives two kinds of frequency offsets. One of them is a frequency offset FSK_AFC_OFS obtained during the data period of frequency shift keying (FSK) modulation, and the other one is a frequency offset PSK_AFC_OFS obtained during the data period of DPSK modulation. Two kinds of the frequency offsets are subtracted from the phase difference data diff_Phase using the operation units 52 and 54.

The phase shift unit 60 has an adder (or a subtractor) to shift the phase difference data diff_phase1 output from the offset compensator 50 by a predetermined amount (e.g., $\pi/8$). Since the phase difference data diff_phase1 represent 0 to $2\pi$ as 8 bits, 256 grayscales, the predetermined amount of $\pi/8$ corresponds to 8'd16 in a decimal notation (or 8'b0010000 in a binary notation).

The mode switch selector 62 is used to select any one of the phase difference data diff_phase1 from the phase shift unit 60 and the phase difference data diff_phase2 from the offset compensator 50. The mode switch selector 62 receives a modulation mode signal PKS_MODE_SEL representing whether the current modulation mode is an 8-DPSK mode or a $\pi/4$-DQPSK mode. Specifically, the mode switch selector 62 selects the output from the phase shift unit 60 in an 8-DPSK mode or the output from the offset compensator 50 in a $\pi/4$-DQPSK mode.

Using the phase shift unit 60 and the mode switch selector 62, it is possible to generalize processes in the subsequent stages regardless of which one is selected from the two modulation modes.

The most significant 3 bits rot_phase[7:5] of the phase difference data rot_phase output from the mode switch selector 62 are output to the encoder 70. The encoder 70 includes a selector or a memory unit for storing a table to encode the three bits based on the value of the phase difference data rot_phase[7:5] and output the phase difference data PHASE_DATA. The encoding operation is performed based on a gray code.

The relationships between the phase difference data rot_phase[7:5] and the phase difference data PHASE_DATA can be represented as follows:
(rot_phase[7:5]: PHASE_DATA[2:0])
(000:000)
(001:001)
(010:011)
(011:010)
(100:110)
(101:111)
(110:101)
(111:100)

In a π/4-DQPSK mode, the phase difference data rot_phase has anyone value of 3'b000, 3'b011, 3'b101, and 3'b111. Most significant 2 bits of the phase difference data PHASE_DATA are meant to be a symbol.

In an 8-DPSK mode, most significant 3 bits of the phase difference data PHASE_DATA are meant to be a symbol. In this way, the phase shift unit 60 and the mode switch selector 62 provided in the previous stage of the encoder 70 allows the process of generating phase difference data to be generalized in both of the two modulation modes.

The phase difference data PHASE_DATA output from the encoder 70 are synchronized with the clock CLK24M by the flip-flop FF6 and output to the symbol selection unit 30.

Least significant 6 bits rot_phase[5:0] of the phase difference data rot_phase are synchronized with the flip-flop FF7. A frequency offset detector averages data based on a phase error signal ERROR_PHASE, determines a sign (i.e., positive or negative) of the averaged value, and performs counting operation in accordance with the sign. The count value that can be obtained in this way is input to the offset compensator 50 as a frequency offset PSK_AFC_OFS.

The symbol selection unit 30 receives the phase difference data PHASE_DATA sampled at a frequency of 16 MHz, and estimates a piece of phase difference data PHASE_DATA most approximate to an expectation value from these values to select the symbol.

Figure 4:
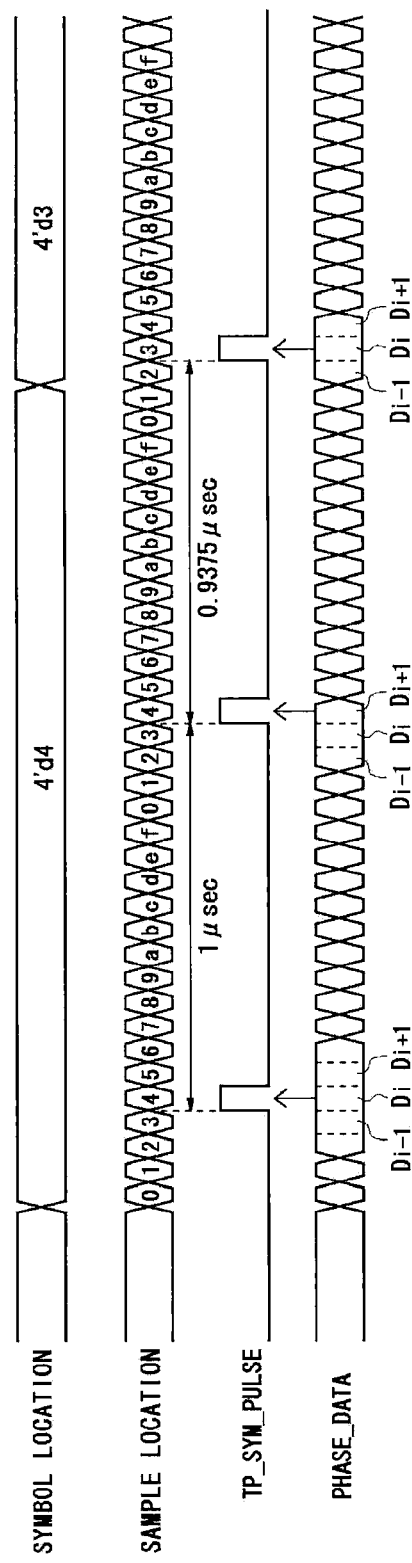
FIG. 4 is a timing chart illustrating symbol selection operation by a symbol selection unit.

FIG. 4 is a timing chart illustrating symbol selection operation in the symbol selection unit 30. A sample location represents where the sampling data is located during the symbol time. The sample location is generated from the counter. The symbol pulse TP_SYM_PULSE represents timing for selecting the symbol.

In an 8-DPSK or π/4-DQPSK mode, since a variation speed of the signal point becomes slow near the timing of an ideal symbol point, the phase difference data PHASE_DATA tends to sustain a constant value.

In this regard, the symbol selection unit 30 determines a location where the encoded phase difference data PHASE_DATA that is output at every sampling time consecutively stay at a constant value as symbol selection timing. According to this method, the phase difference data having a phase shift amount most approximate to the expectation value can be estimated and selected as a symbol.

Specifically, the symbol selection unit 30 selects, as a subsequent symbol, the phase difference data of sampling time delayed by one symbol time Tsym(=1 μsec) from the sampling time selected as a current symbol, when the phase difference data Di selected as a symbol at any sampling time corresponds with the phase difference data Di−1 preceding by one sampling time, and the phase difference data Di selected as a symbol at any sampling time corresponds with the phase difference data Di+1 delayed by one sampling time.

Additionally, the symbol selection unit 30 selects the next symbol at the timing set to be shorter than one previous symbol time Tsym when the phase difference data Di selected as a symbol at any sampling timing does not correspond with the phase difference data Di+1 of one subsequent sampling timing. For example, the current symbol time is set to 0.9375 μsec (=Tsym−Ts=15/16 μsec) shorter than the previous symbol time Tsym (e.g., 1 μsec) by one sampling time Ts.

On the contrary, the symbol selection unit 30 sets up next the symbol selection timing to be longer than the one symbol time Tsym when the phase difference data Di selected as a symbol at any sampling timing does not correspond with the phase difference data Di−1 preceding by one sampling time. For example, the symbol selection timing is set to 1.0625 μsec(=Tsym+Ts=17/16 μsec) which is longer than one sampling time Ts by one symbol time Tsym.

In other words, when the symbol time Tsym is equal to n multiples of the sampling time Ts (where, n is any natural number), for the data period, the symbol selection unit 30 selects, as a candidate of the current symbol, a piece of the phase difference data delayed by one symbol time from the phase difference data selected as a previous symbol and preceding and following m pieces of the phase difference data (where, $1 \leq m < n$) of it, among the phase difference data PHASE_DATA generated at every sampling time. For example, m is set to 1 (m=1) in FIG. 4.

This process is valid during the data period. For the preamble period preceding the data period, it is preferable to perform the processing described below.

When the symbol time Tsym is equal to n multiples of the sampling time Ts (where, n is any natural number), for the preamble period, the symbol selection unit 30 selects all pieces of the phase difference data PHASE_DATA generated at every sampling time as a candidate of the current symbol.

Specifically, the location of the symbol point is determined by comparing the expectation value of the synchronization pattern included in the preamble while temporally shifting the phase difference data PHASE_DATA generated at every sampling time. The initiation time of the data period can be accurately obtained by designating all pieces of the phase data for the preamble period as a candidate.

From a different viewpoint, when the symbol time Tsym is equal to n multiples of the sampling time Ts (where, n is any natural number), the symbol selection unit 30 selects, as a candidate of the current symbol, a piece of the phase difference data delayed by one symbol time Tsym from the phase difference data selected as a previous symbol and preceding and following m pieces of phase difference data of the piece of the delayed phase difference (where, $1 \leq m < n$), among the phase difference data PHASE_DATA generated at every sampling time, and changes the value of the natural number m between the preamble period and the data period. According to this process, the symbol point can be very appropriately selected in both the preamble period and the data period.

The invention will now be described based on preferred embodiments which do not intend to limit the scope of the present invention but exemplify the invention. All of the features and the combinations thereof described in the embodiment are not necessarily essential to the invention.

What is claimed is:

1. A demodulation circuit for demodulating a differential phase shift keying (DPSK) modulated received signal, the circuit comprising:
   a phase difference data generator which compares phase data representing a phase of the received signal input at every predetermined sampling time with previous phase data preceding by one symbol period to generate phase difference data representing a phase shift amount between the phase data and the previous phase data; and
   a symbol selection unit which evaluates the phase difference data generated at every sampling time to select as a symbol, wherein
   the symbol selection unit selects, as a subsequent symbol,
   (1) a phase difference data at a sampling time delayed by one symbol period from a sampling time of a current symbol, when the phase difference data Di at the sampling time of the current symbol corresponds with a phase difference data Di−1 preceding by one sampling period from the sampling time of the current symbol, and the phase difference data Di corresponds with a phase difference data Di+1 delayed by one sampling period from the sampling time of the current symbol, (2) a phase difference data at a sampling time delayed by a first period shorter than the symbol period from the sampling time of the current symbol, when the phase difference data Di does not corresponds with the phase difference data Di+1, and (3) a phase difference data at a sampling time delayed by a second period longer than the symbol period from the sampling time of the current symbol, when the phase difference data Di does not corresponds with the phase difference data Di−1.

2. The demodulation circuit according to claim 1, wherein the phase difference data generator comprises:
a memory unit which stores the phase data input at every sampling time; and
a first operation unit which computes a phase shift amount of current phase data for the phase data preceding by one symbol period stored in the memory unit to generate the phase difference data.

3. The demodulation circuit according to claim 2, wherein the memory unit is an n-stage First-In-First-Out (FIFO) memory when the symbol period is n multiples of the sampling period and n is any natural number.

4. The demodulation circuit according to claim 2, wherein the phase difference data generator has a second operation unit which shifts the phase difference data by a predetermined amount corresponding to π/8, and wherein the phase difference data shifted by the predetermined amount in the second operation unit is transferred to a subsequent process when the received signal is 8-DPSK modulated.

5. The demodulation circuit according to claim 1, wherein the phase difference data generator encodes a predetermined number of bits having an upper level of the phase difference data and outputs them to the symbol selection unit.

6. The demodulation circuit according to claim 1, wherein the symbol selection unit selects phase difference data having a value most approximate to a predetermined expectation value as a symbol.

7. The demodulation circuit according to claim 5, wherein the symbol selection unit determines, as a symbol selection timing, a location where the encoded data output at every sampling time consecutively has a constant value.

8. The demodulation circuit according to claim 1, wherein for a data period, the symbol selection unit selects, as a current symbol candidate, a piece of the phase difference data delayed by one symbol period from the phase difference data selected as a previous symbol and preceding and following m pieces of the phase difference data among the phase difference data generated at any sampling time when the symbol period is n multiples of the sampling period, and n is any natural number and 1≦m<n.

9. The demodulation circuit according to claim 1, wherein for a preamble period, the symbol selection unit selects as a current symbol candidate all pieces of the phase difference data generated at every sampling time when the symbol period is n multiples of the sampling period and n is any natural number.

10. The demodulation circuit according to claim 1, wherein the symbol selection unit selects as a current symbol candidate the phase difference data delayed by one symbol period from the phase difference data selected as a previous symbol and preceding and following m pieces of the phase difference data among the phase difference data generated at every sampling time when the symbol period is n multiples of the sampling period n is any natural number and 1≦m<n, and wherein
a value of the natural number m is changed between the preamble period and the data period.

11. The demodulation circuit according to claim 1, wherein the received signal is a Bluetooth signal.

12. The demodulation circuit according to claim 1, wherein the first period is shorter than said one symbol period by said one sampling period.

13. The demodulation circuit according to claim 1, wherein the second period is longer than said one symbol period by said one sampling period.

14. A wireless device comprising:
a receiver circuit which receives a differential phase shift keying (DPSK) modulated received signal and generates phase data representing a phase of the received signal at every predetermined sampling time; and
a demodulation circuit which demodulates the phase data output from the receiver circuit
wherein the demodulation circuit demodulates the differential phase shift keying (DPSK) modulated received signal, the demodulation circuit comprises:
a phase difference data generator which compares the phase data representing the phase of the received signal input at every predetermined sampling time with previous phase data preceding by one symbol time-period to generate phase difference data representing a phase shift amount between the phase data and the previous phase data; and
a symbol selection unit which evaluates the phase difference data generated at every sampling time to select as a symbol, wherein
the symbol selection unit selects, as a subsequent symbol,
(1) a phase difference data at a sampling time delayed by one symbol period from a sampling time of a current symbol, when the phase difference data Di at the sampling time of the current symbol corresponds with a phase difference data Di−1 preceding by one sampling period from the Sampling time of the current symbol, and the phase difference data Di corresponds with a phase difference data Di+1 delayed by one sampling period from the sampling time of the current (2) a phase difference data at a sampling time delayed by a first period shorter than the symbol period from the sampling time of the current symbol, when the phase difference data Di does not corresponds with the phase difference data Di+1, and (3) a phase difference data at a sampling time delayed by a second period longer than the symbol period from the sampling time of the current symbol, when the phase difference data Di does not corresponds with the phase difference data Di−1.

* * * * *